G. STEVENSON.
Pulverizing-Cultivators.
No. 200,355. Patented Feb. 12, 1878.
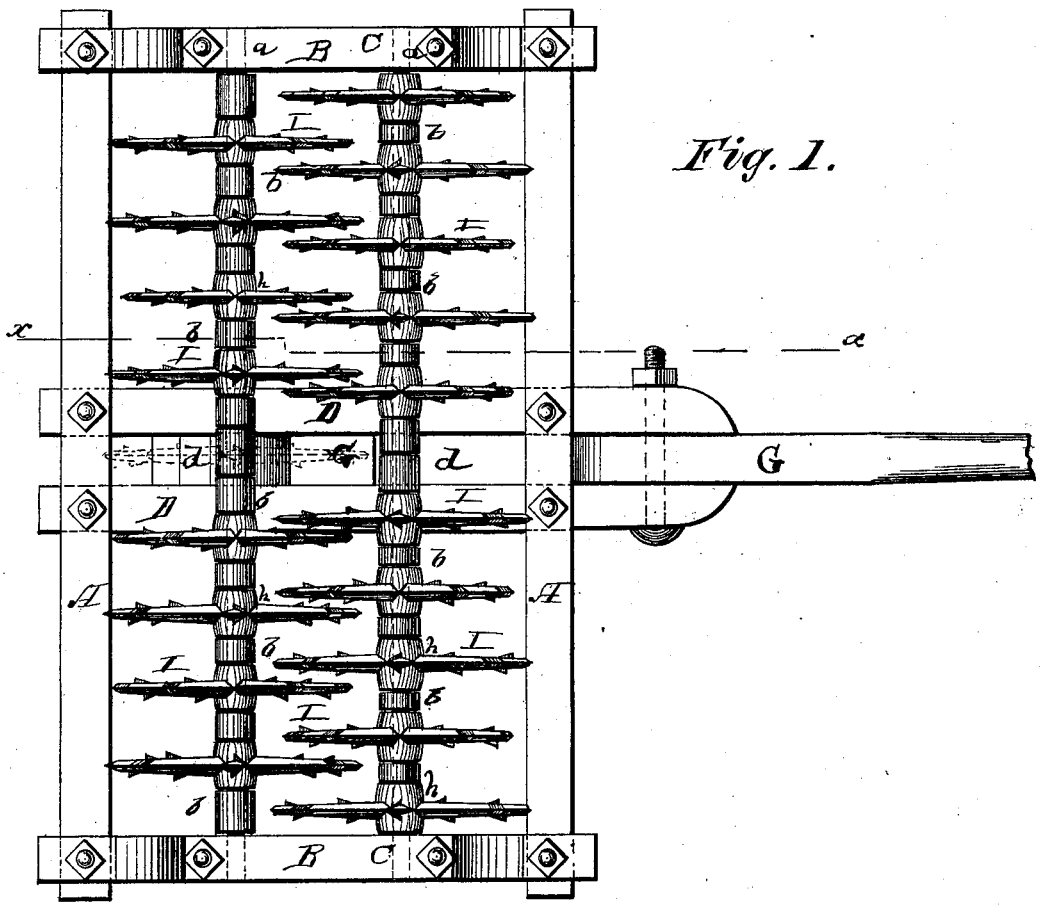

UNITED STATES PATENT OFFICE.

GEORGE STEVENSON, OF ZIONSVILLE, INDIANA.

IMPROVEMENT IN PULVERIZING-CULTIVATORS.

Specification forming part of Letters Patent No. 200,355, dated February 12, 1878; application filed July 16, 1877.

*To all whom it may concern:*

Be it known that I, GEORGE STEVENSON, of Zionsville, in the county of Boone and State of Indiana, have invented certain new and useful Improvements in Pulverizers or Cultivators; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The nature of my invention consists in the construction and arrangement of a pulverizer and cultivator, as will be hereinafter more fully set forth.

In the annexed drawing, to which reference is made, and which fully illustrates my invention, Figure 1 is a plan view of my invention. Fig. 2 is a vertical section of the same through the line $x\ x$, Fig. 1.

The frame of my machine is composed of two parallel beams, A A, connected at or near their ends by side pieces B B, which have blocks C C secured on their under sides. Across the top, at the center, are secured two bars, D D, between which the seat E and tongue G are attached.

The various parts of the frame are connected together by bolts, without mortises and tenons of any form, so as to retain their entire strength and form a firm and durable frame.

In the side-piece blocks C C are placed two rods, $a\ a$, upon each of which is placed a series of loose star-wheels, I I, and between said wheels, on the shafts, are placed loose thimbles or tubes $b\ b$, of any desired length for the purpose of adjusting the wheels to the required distance apart. These tubes or thimbles may, as stated, be of any desired length, and they may be exchanged for others of different lengths when it is desired to change the distances between the wheels.

When the machine is used as a cultivator the center wheel on each shaft is removed and a tube or thimble, $d$, is placed on the shafts at these points, so as to leave a sufficient space in the center for the row of plants. When used as a pulverizer these center wheels are replaced. In either case the wheels on the two shafts are so arranged as to alternate, as shown.

When the space is left in the center, young corn or other plants that are planted in straight rows can be cultivated without injury by the wheels straddling such rows.

The star-wheels I are constructed substantially in the manner described in former patents granted to me for such wheels, said wheels being provided with hubs $h$.

Having thus fully described my invention, what I claim as new, and desire to secure by Letters Patent, is—

The thimbles or tubes $b\ b$, in combination with the rods $a$ and the star-wheels I, having hubs $h$, and the frame, whereby the wheels may be adjusted to any desired distance apart in relation to each other, constructed and arranged substantially as and for the purpose set forth.

In testimony that I claim the foregoing as my own I have hereto affixed my signature in presence of two witnesses.

GEORGE STEVENSON.

Witnesses:
    M. S. DAVENPORT,
    JACKSON DARBENSPECK.